Sept. 22, 1925.

W. A. LUDLOW 1,554,743

UNIVERSAL PISTON ROD CONNECTION

Filed Jan. 23, 1924

Inventor
William A. Ludlow

By
Attorney

Patented Sept. 22, 1925.

1,554,743

UNITED STATES PATENT OFFICE.

WILLIAM A. LUDLOW, OF PONTIAC, MICHIGAN.

UNIVERSAL PISTON-ROD CONNECTION.

Application filed January 23, 1924. Serial No. 687,979.

*To all whom it may concern:*

Be it known that I, WILLIAM A. LUDLOW, a citizen of the United States of America, residing at Pontiac, in the county of Oakland and State of Michigan, have invented certain new and useful Improvements in Universal Piston-Rod Connections, of which the following is a specification.

This invention relates to certain new and useful improvements in the connecting means between a piston and piston rod wherein the connection is of the universal type to permit free rotary movement of the piston with respect to the rod to insure proper engagement between the piston and the walls of a cylinder.

The primary object of the invention is to provide a universal piston rod connection of the ball and socket type, the socket member of the connection being adjustable to compensate for wear and also for obtaining the proper engagement or mounting of the ball member within the socket.

Another object of the invention is to mount a piston upon one end of a connecting or piston rod in a manner to permit freedom of movement thereof within the wall of a cylinder whereby symmetrical wearing of the piston and cylinder walls is obtained, lubricating means being provided for the ball and socket connection to insure proper working conditions therefor.

With these general objects in view and others that will appear as the nature of the invention is better understood, the same consists of the novel form, combination and arrangement of parts hereinafter more fully described, shown in the accompanying drawing and claimed.

Figure 1:
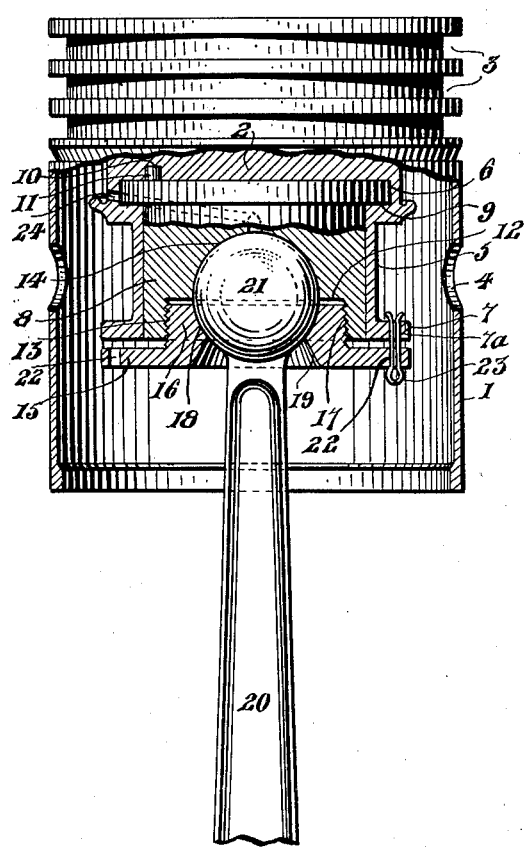
Figure 2:
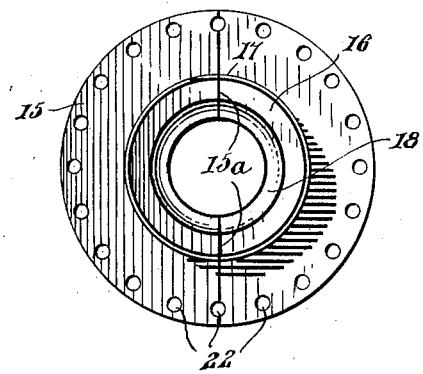
Figure 3:
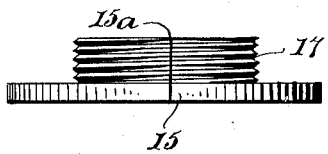

In the drawing, wherein like reference characters designate corresponding parts parts throughout the several views, Figure 1 is a longitudinal sectional view of a piston and connecting rod showing the universal connection therebetween, Figure 2 is a plan view of the removable section of the socket member for the universal connection, and Figure 3 is an edge elevational view of the member shown in Fig. 2.

The connection between the upper end of a connecting or piston rod and the piston head is generally of the wrist pin type wherein the piston body is pivotally supported upon the upper end of the piston rod and is capable of movement in one direction only with the result that the piston eventually wears to an improper fit within the bore of a cylinder due to expansion and contraction of the latter causing the pumping of oil and a consequent loss of power. The primary object of the present invention is to provide a universal connection between the upper end of a connecting rod or piston rod with the body of the piston which will permit unrestricted freedom of movement of the piston on the piston rod, the piston being capable of rotation upon the piston rod and causing an even wear on the contacting faces of the piston and cylinder bore. Referring more in detail to the accompanying drawing which illustrates one embodiment of the invention, the reference numeral 1 designates the side wall of a piston open at its lower end and having depending internally thereof from the solid head, an integral block 2 spaced from the inner faces of the side wall 1 of the piston, the latter being provided with the usual ring receiving grooves 3 and side wall openings 4.

The piston is preferably cast with a core, which is so formed as to produce in outline, the integral block 2. One element of the socket, constituting a part of the universal connection between the piston and the piston rod, is made temporarily a part of said core and is so disposed as to allow it to become cast with and surrounded by the metal of the aforesaid integral block 2, and the extension of said block 2, shown at 5, is provided with a flange outwardly directed at 7, having an opening 7ª, extending therethrough as shown in Fig. 1. The fixed element of the two-part socket member for the universal connection includes a bronze body 8, which is machined in a manner to include a flanged projection 6, at the upper end thereof and of sufficient length to come flush with the lower surface of the flange 7. The bronze body 8 is supplied with a suitable dowel pin, machined therein at 11, and which is surrounded by the metal of the integral block 2, at 10, while the said metal is still in a plastic state, during the casting operation. The shoulder 9, serves to hold the bronze member 8 within the block 2, and the dowel pin serves to prevent relative rotary motion of member 8, therein. The lower face of the socket member 8 is provided with a central cavity 12, the side wall of which is threaded as at 13 while a substantially semi-circular socket 14 is formed centrally of the socket member 8 in the bottom wall of the cavity 12.

The cooperating socket member associated with the element 8 is shown in detail in Figs. 2 and 3 and includes a disk plate 15 having a central body projection 16 that is externally threaded as at 17 for engagement with the threads 13 upon the socket member 8. The portion 16 has a central opening formed therein, the upper portion thereof being curved upwardly and outwardly as at 18 from a horizontal line, while the lower side of said opening is inclined outwardly as at 19 as shown in Fig. 1. Said disk plate 15, is made in bi-form and soldered together for machining purposes, as disclosed in the drawing at 15ª in Figs. 2 and 3, and afterwards broken apart, thus adapting it to be reassembled, as surrounding the piston rod 20, below the ball head 21, that is received in the pocket 14 of the socket member 8, the socket member 15 being mounted upon the piston rod 20 and having the curved face 16 thereof moved into engagement with the lower side of the piston rod ball 21 and threaded into the lower end of the socket member 8 for connecting the piston rod to the body of the piston to permit universal movement of the piston relative to the rod. A plurality of openings 22 are arranged in circular series in the disk 15 adjacent the peripheral edge thereof and in alinement with the opening 7ª in the flange 7, a cotter pin 23 or similar fastening device being selectively positioned in one of the openings 22 and passed through the opening 7ª with the ends thereof spread apart by a suitable implement that may be inserted through the side opening 4 in the piston body. Lubrication of the ball and socket connection is accomplished by the provision of the angular port 24 extending through the piston block 2 and socket member 8 to form an oil passage from the interior of the piston to the upper side of the ball 21, the parts being thoroughly lubricated while adjustments to compensate for wear are accomplished by shifting the disk 15 with respect to its cooperating socket member 8 as will be obvious from an inspection of Fig. 1.

From the above detail description of the device, it is believed that the construction and operation thereof will at once be apparent, it being noted that by the provision of the universal connection between the piston rod and body of the piston, the latter is permitted to move freely in any direction upon the upper end of the piston rod to assume various rotary positions within the bore of a cylinder and evenly compensating for wear therein, and while there is herein shown and described the preferred embodiment of the present invention, it is nevertheless to be understood that minor changes may be made therein without departing from the spirit and scope of the invention as claimed.

What is claimed as new is:—

1. In a piston rod and piston connection, the combination with a piston and piston rod, of a two-part socket member carried by the piston, a ball carried by the piston rod and fitting in the socket member, an oil port formed in the socket member in communication with the working faces of the ball and socket members, said piston having an internal hollow tubular extension carried by the head thereof, said tubular extension having a peripheral flange provided with a channel communicating with said oil port, one of the socket members cast therein and the other socket member having a threaded engagement therewith, and means for holding the socket members in rotatably adjusted positions.

2. In a piston rod and piston connection, the combination with a piston and piston rod, of a two-part socket member carried by the piston, a ball carried by the piston rod and fitting in the socket member, said piston having an internal hollow tubular extension carried by the head thereof, said tubular extension having a peripheral flange provided with a channel communicating with said oil port one of the socket members cast therein and the other socket member having a threaded engagement therewith, and an interlocking connection between the piston and socket member cast therein to prevent rotary and longitudinal movement of the socket member relative to the piston.

3. In a piston rod and piston connection, the combination with a piston and piston rod, of a two-part socket member carried by the piston, a ball carried by the piston rod and fitting in the socket member, an oil port formed in the socket member in communication with the working faces of the ball and socket members, said piston having an internal hollow tubular extension carried by the head thereof, said tubular extension having a peripheral flange provided with a channel communicating with said oil port one of the socket members cast therein and the other socket member having a threaded engagement therewith, and an interlocking connection between the piston and socket member cast therein to prevent rotary and longitudinal movement of the socket member relative to the piston.

4. In a piston for automobiles, a socket member of cylindrical form having a flange at its upper end and provided with an eccentrically disposed projection, said socket member being provided with a threaded bore in its lower end terminating upwardly in a semi-spherical recess, a second socket member having a threaded body screwed into the threaded recess of the first socket member and provided at its lower end with a peripheral flange, said second socket member having an opening therethrough the upper end of which is segmento-spherical and the lower end of which is flaring whereby a bore may be held between said first and second member, a piston body having a closed upper end and depending skirt, said body being further provided with an internal hollow tubular extension depending from the head and surrounding the first socket member, and means for connecting the tubular extension and second socket member.

In testimony whereof I affix my signature.

WILLIAM A. LUDLOW.